(12) United States Patent
Harmsma et al.

(10) Patent No.: US 10,794,825 B2
(45) Date of Patent: Oct. 6, 2020

(54) PHOTONIC CIRCUIT FOR MEASURING A SAMPLE

(71) Applicant: Nederlandse Organisatie voor toegepast-natuurwetenschappelijk onderzoek TNO, s-Gravenhage (NL)

(72) Inventors: Peter Johan Harmsma, Vleuten (NL); Bart Michiel de Boer, Rotterdam (NL)

(73) Assignee: Nederlandse Organisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 0 days.

(21) Appl. No.: 16/478,954

(22) PCT Filed: Jan. 30, 2018

(86) PCT No.: PCT/NL2018/050061
§ 371 (c)(1),
(2) Date: Jul. 18, 2019

(87) PCT Pub. No.: WO2018/143797
PCT Pub. Date: Aug. 9, 2018

(65) Prior Publication Data
US 2019/0353588 A1 Nov. 21, 2019

(30) Foreign Application Priority Data

Jan. 31, 2017 (EP) .................... 17153868
Jul. 27, 2017 (EP) .................... 17183545

(51) Int. Cl.
*G01B 9/02* (2006.01)
*G01N 21/45* (2006.01)

(52) U.S. Cl.
CPC ....... *G01N 21/45* (2013.01); *G01N 2021/458* (2013.01)

(58) Field of Classification Search
CPC ............ G01N 21/45; G01N 2021/458; G01B 9/02023; G01B 9/02027; G01B 9/02051
See application file for complete search history.

(56) References Cited

U.S. PATENT DOCUMENTS

| 2004/0023396 | A1* | 2/2004 | Boyd ............... G01N 33/54373 385/12 |
| 2012/0182552 | A1 | 7/2012 | Heidrich et al. |
| 2016/0265898 | A1 | 9/2016 | Schreuder et al. |

FOREIGN PATENT DOCUMENTS

| EP | 2267432 A1 | 12/2010 |
| WO | WO 2013/053930 A1 | 4/2013 |
| WO | WO 2014/154283 A1 | 10/2014 |

OTHER PUBLICATIONS

Ping Hua et al., "Integrated Optical Dual Mach-Zehnder Interferometer Sensor," Sensors and Actuators B, vol. 87, No. 2, pp. 250-257, XP004391048 (Dec. 10, 2002).
(Continued)

*Primary Examiner* — Tarifur R Chowdhury
*Assistant Examiner* — Jonathon Cook
(74) *Attorney, Agent, or Firm* — Leydig, Voit & Mayer, Ltd.

(57) ABSTRACT

A method and system for measuring a sample property (X) by means of photonic circuit (10). The photonic circuit (10) comprises at least two photonic sensors (11, 12) configured to modulate the light according to respective output signals (S1,S2) with periodically recurring signal values (V1, V2). The photonic sensors (11, 12) comprise a low range sensor (11) with a relatively low range or high sensitivity for measuring a change (ΔX) of the sample property (X) and a high range sensor (12) with a relatively high range or low sensitivity to measure the change (ΔX) of the sample property (X). The sample property (X) is calculated by combining the output signals (S1, S2) of the sensors (11, 12).

(Continued)

Particularly, the second output signal (S2) of the high range sensor (12) is used to distinguish between recurring signal values (V1) in the first output signal (S1) of the low range sensor (11).

14 Claims, 5 Drawing Sheets

(56) References Cited

OTHER PUBLICATIONS

European Patent Office, International Search Report in corresponding International Application No. PCT/NL2018/050061 dated Mar. 9, 2018 (3 pages).

* cited by examiner

PHOTONIC CIRCUIT FOR MEASURING A SAMPLE

CROSS-REFERENCE TO RELATED APPLICATIONs

This patent application is a U.S. National Phase of PCT international Application No. PCT/NL2018/050061, filed Jan. 30, 2018, which claims priority to European Application No. 17183545.7, filed Jul. 27, 2017, and European Application No. 17153868.9, filed Jan. 31, 2017, which are both expressly incorporated by reference in their entireties, including any references contained therein.

TECHNICAL FIELD AND BACKGROUND

The present disclosure relates to refractive index sensing by means of sensors such as ring resonators and other interferometric devices in a photonic circuit.

Two main types of on-chip refractive index sensors exist: ring resonators Mach-Zehnder Interferometers (MZIs) In a contribution by the inventors to an article in the Journal of Selected Topics in Quantum Electronics (Volume: 23, Issue: 2, March-April 2017), a comparison is given between ring resonators and three-port Mach-Zehnder Interferometer (MZI) devices for the purpose of refractive index sensing. The article teaches that three-port MZI devices have the advantage of a constant and scalable sensitivity, high-bandwidth read-out, no directional ambiguity, and a simple interrogation setup which does not require a wavelength sweep. However, MZI devices have a relatively large footprint on the chip mainly determined by the long path length required to obtain a high sensitivity. Moreover, each MZI sensor must be optically connected to a read-out unit individually. Ring resonators on the other hand have a smaller footprint, and multiple sensors can be multiplexed onto a single optical interface. In applications where many sensors are required, resonators are the preferred sensors in order to limit the number of expensive optical connections to the chip. The ring resonator read-out unit must acquire the spectral response of the ring resonator, which is a relatively slow measurement. Normally, experimental conditions must be such that successive spectra do not shift by more than half their Free Spectral Range (FSR), because in that case the actual shift may be the observed shift plus or minus an integer times the FSR. However, ring resonators having narrow resonances and small FSRs are preferred to have high sensitivity, and to limit the required wavelength scan range in order to reduce the cost of the read-out unit.

There is yet a need for further improvement in refractive index sensing by means of sensors, in particular with regards to increasing sensitivity over an extended range preferably at minimal footprint.

SUMMARY

Aspects of the present disclosure relate to methods and systems for measuring a sample property by means of a photonic circuit. Measurement of photonic circuits typically comprises application of input light into the photonic circuit and measuring output light out of the photonic circuit. As described herein, the photonic circuit comprises at least two photonic sensors. The photonic sensors are configured to modulate output light with respect to the input light, i.e. they act as a wavelength filter, where the sensor is configured such that the filter function depends on a specific measured quantity. Signal values of the output signals periodically recur as a function of a wavelength of the input light according to a respective wavelength interval. The wavelengths at which the recurring signal values occur, shift as a function of change in the sample property to be measured. The photonic sensors comprise at least one low range sensor having relatively low range to the change of the sample property and at least one high range sensor having relatively high range to the change of the sample property. Typically, the low range sensor has better sensitivity to the sample property than the high range sensor. Advantageously, the sample property can be calculated by combining the output signals of multiple sensors. In particular, the second output signal of the high range sensor can be used to distinguish between recurring signal values in the first output signal of the low range sensor.

It will be appreciated that the synergetic combination as described herein allows the sample property to be measured with high accuracy of a low range periodic sensor but with the extended measurement range of the high range sensor, which may have relatively low sensitivity. For example, interferometric devices having different periodic responses can be combined. The periodic response can be set e.g. by the dimensions of the sensor circuits and/or dependency of the effective refractive index in the sensor waveguides to the sample property. Accordingly, the sample induced wavelength shift relative to the sensor period (e.g. FSR) can be higher in the low range sensor than in the high range sensor. Various combinations of sensors can be envisaged. For example, the sensors can have different sensitivities to the sample property depending on different shielding or coating between the sensor and sample. Alternatively, or in addition, different size waveguides can be used to achieve different wavelength periods for different sensors. Alternatively, or in addition, different types of sensors can be combined. For example a combination of a high range multi-path interferometer (e.g. MZI) and one or more ring resonator may provide a relatively small footprint for multiple low range sensors operable over an extended range.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
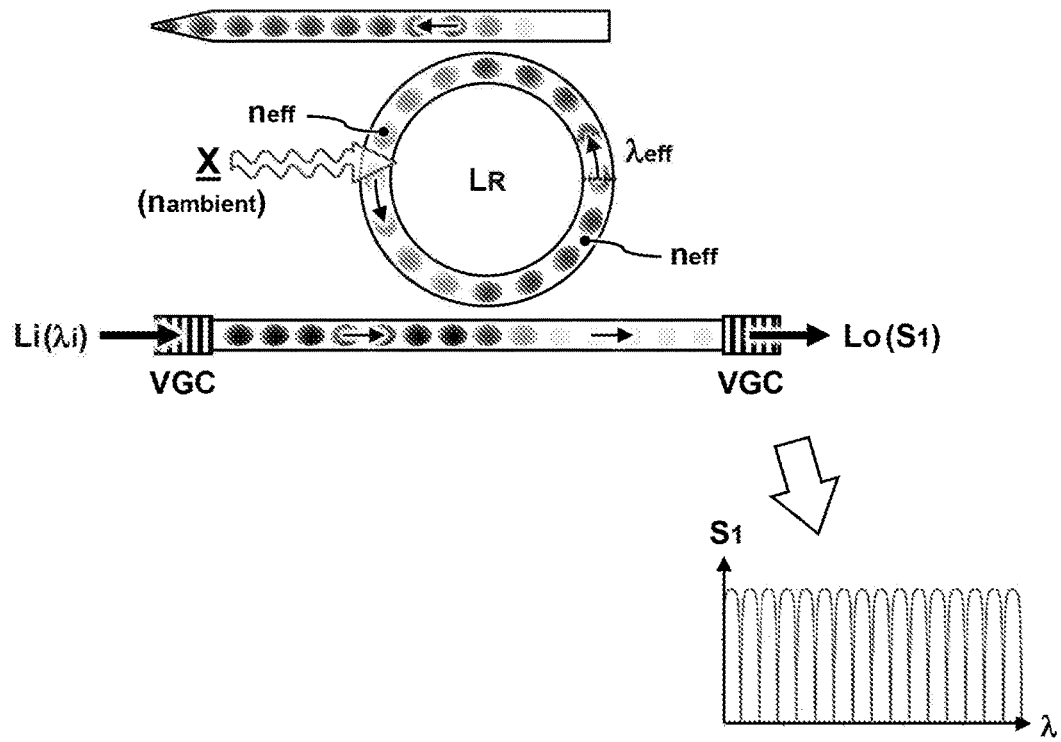
FIG. 1A schematically illustrates a ring resonator and corresponding signals.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
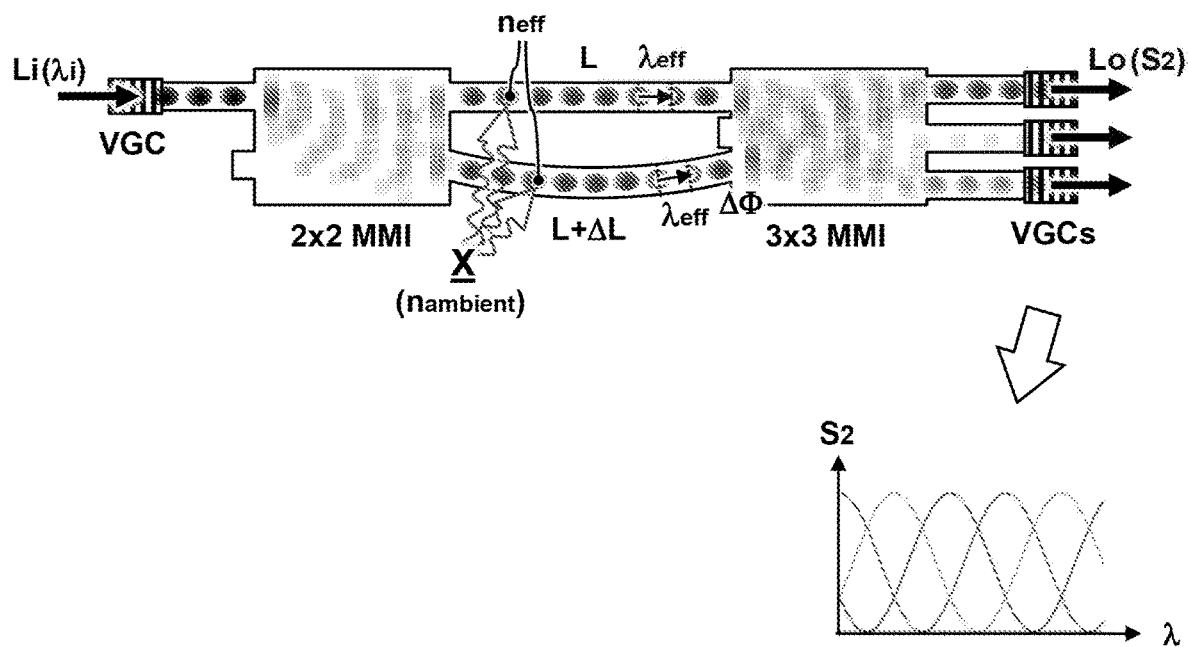
FIG. 1B schematically illustrates an MZI and corresponding signals.

FIGS. 1A and 1B schematically illustrate examples of photonic sensors with periodic response behavior. FIG. 1A illustrates an example of a ring resonator. FIG. 1B illustrates an example of a multi-path interferometer, in this case a three-port Mach-Zehnder Interferometer (MZI).

Without being bound by theory, the principle on which photonic sensors typically rely are changes of the effective refractive index $n_{eff}$ of the waveguide mode due to changes in the sample property "X" to be measured. The changes of the sample property can manifest in corresponding changes of its ambient refractive index $n_{ambient}$, which can influence the effective refractive index $n_{eff}$ of the waveguide mode index e.g. via evanescent field interaction. This can be written as $$\Delta n_{eff} = \frac{\partial n_{eff}}{\partial n_{ambient}} \Delta n_{ambient}$$

where the partial derivative may depend on parameters such as the wavelength and waveguide geometry.

For example, in a ring resonator such as shown in FIG. 1A, light can be coupled into a circular waveguide with circumference $L_R$. A resonating condition may occur for wavelengths $\lambda_{res}$ that fit an integer amount of times in the circumference $L_R$ because of constructive interference:

$$\lambda_{res} = \frac{L_R n_{eff}(\lambda_{res})}{m}$$

in which m is an integer called the mode number, e.g. the number of times the effective wavelength fits in the waveguide. At these resonant wavelengths, the sensor transmission shows a sharp minimum or maximum at these resonance wavelengths, as shown in the plot of the signal S1 versus wavelength λ. Taking dispersion into account, the shift in resonant wavelengths as a result of a change in $n_{ambient}$ may be calculated as:

$$\Delta \lambda_{res} = \frac{\lambda_{res}}{n_g(\lambda_{res})} \Delta n_{eff}$$

where $n_g$ is the group index and the $\Delta n_{eff}$ is given by the equation above. Changes in the sample property X can be obtained from changes in the index $n_{eff}$ which are obtained by measuring consecutive wavelength sweeps and identifying the shifts of the resonance wavelengths in these sweeps.

In the example of FIG. 1B, the MZI has arms lengths which differ by an amount ΔL. Accordingly an increase in $n_{eff}$ will induce a larger phase difference ΔΦ in the longer arm. Alternatively, an MZI can be implemented with equal arm lengths, where one of the arms is covered by a shielding layer. In such a configuration, the influence of temperature fluctuations is reduced since both arms will experience comparable refractive index change as the temperature changes. For both configurations the phase difference due to changes in the effective index can be expressed as $$\Delta \Phi = \frac{2\pi \Delta L}{\lambda} \Delta n_{eff}$$

where ΔL stands for either the sensing window length or arm length difference for equal and unequal arms lengths, respectively. As is clear from this equation, the phase sensitivity scales with ΔL allowing for a tunable high or low sensitivity, corresponding to a low or high range, respectively. As opposed to a conventional 2×2 MZI, the 3×3 MZI combines both arms with a 3×3 coupler resulting in three outputs that have a mutual 120 degrees phase difference. This can have advantages in readout.

Typically, input light ""Li"" with an input wavelength $\lambda_i$ is coupled into the photonic circuit, e.g. using a Vertical Grating Couplers (VGC) or other type coupler. Output light ""Lo"" may similarly be coupled out of the circuit. The output light ""Lo"" may comprise as respective signal $S_1$ or $S_2$ which may depend on the interaction between the sensor and the sample property "X".

For a ring resonator such as shown in FIG. 1A, typically, the input wavelength $\lambda_i$ is varied as function of time "t", e.g. within a wavelength range ""R"". Alternatively, a broad spectrum input can be used and the output light spectrally resolved. The output signal $S_1$ may comprise information of the light intensity as a function of wavelength to determine characteristic signal values, e.g. the resonance dip or peak. Generally, the effective wavelength $\lambda_{eff}$ in the ring-shaped waveguide may depend on the input wavelength $\lambda_i$ (which is a function of time here) and the refractive index $n_{eff}$ in the waveguide (which depends on the sample property "X"). The sample property "X" can be determined by keeping track of the position of a resonance wavelength $\lambda_{res}$ which manifests as a dip in the intensity of the output signal here. The resonance wavelength may shift e.g. when the effective refractive index $n_{eff}$ in the waveguide shifts over time.

For an MZI such as shown in FIG. 1B, the output signals $S_2$ comprise relative intensities which are a measure of the phase difference ΔΦ between light paths, e.g. caused by a path length difference and/or difference in refractive index between paths. It is sufficient to measure the relative intensities only at one input wavelength $\lambda_i$ to obtain the phase difference $\Delta\Phi$. Alternatively, the phase shift can be retrieved at the same multiple wavelengths at which also the ring resonator transmission is measured.

In the example of FIG. 1B, a 3-port interferometer is shown. Assuming an ideal device, the individual signals can be described by $$P_n = \frac{P_0}{3}\left[1 + V\sin\left(\Delta\Phi + \frac{2\pi(n-1)}{3}\right)\right]$$

where $P_n$ is the output power at output n, $P_0$ is the total input power, V the fringe visibility, $\Delta\Phi$ the phase difference and n=1, 2, 3 the path number. The equation contains three unknowns ($P_0$, V and $\Delta\Phi$), and three values $P_n$ so that each unknown can be solved for. Using the equation and assuming normalized signals, the obtained expression for $\Delta\Phi$ can be calculated by:

$$\tan(\Delta\Phi) = \sqrt{3}\frac{P_2 - P_3}{2P_1 - P_2 - P_3}$$

As opposed to the commonly applied 2-port interferometer, the phase calculation is not sensitive to power or visibility variations. Moreover, the 2-port implementation has zero sensitivity and ambiguous reading when the phase equals an integer times pi, which is not the case for the 3-port implementation.

An important parameter of a photonic sensor with periodic response such as the ring resonator is the free spectral range (FSR) which is the spacing in wavelength between resonances, e.g. written as $$(\Delta\lambda)_{FSR} = \frac{\lambda^2}{n_g L}.$$

The spacing depends on the wavelength $\lambda$ but this may be negligible at higher mode numbers. Alternatively, the reciprocal wavelength $1/\lambda$ can be used, in which case the FSR is wavelength independent, and is given by:

$$\left(\Delta\frac{1}{\lambda}\right)_{FSR} = \frac{1}{n_g L}.$$

Conventionally, the experimental conditions using ring resonators are kept such that successive spectra do not shift by more than half an FSR, because in that case the actual shift may not be unambiguously determined. A similar problem may occur for other photonic sensors having periodic response such as the MZI. In the latter case, a phase shift of more than $2\pi$ may be ambiguous. For example, the observed shift can be the actual shift plus or minus an integer times the FSR. These and other problems may be alleviated using a combination of different sensitivity sensors as described in the following.

Figure 2A:
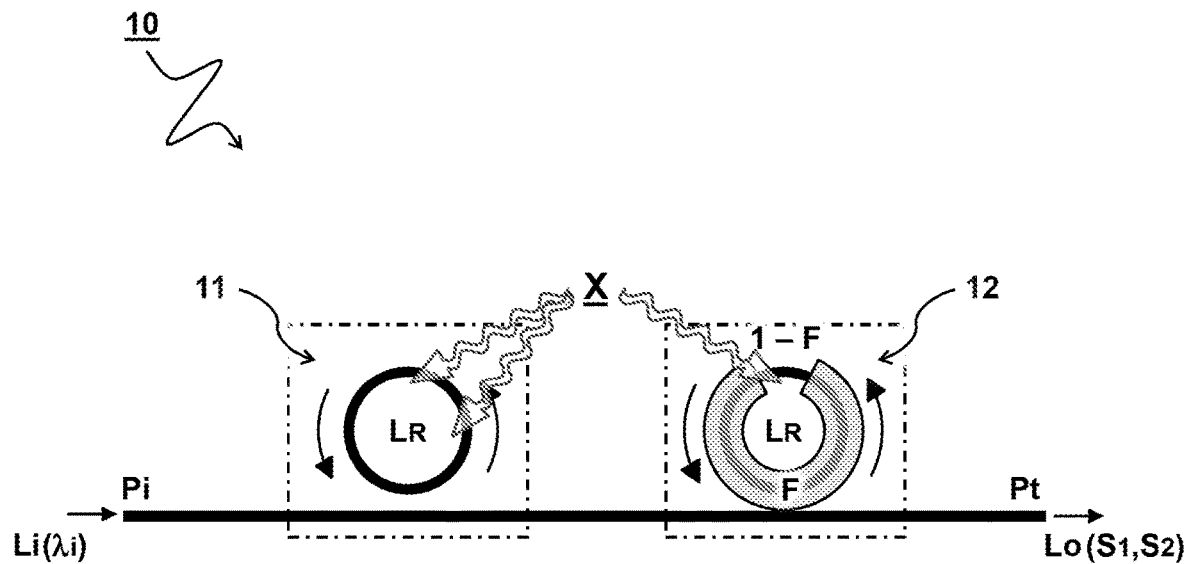
FIG. 2A schematically illustrates an embodiment of a photonic circuit comprising two ring resonators with different sensitivity.
Figure 2B:
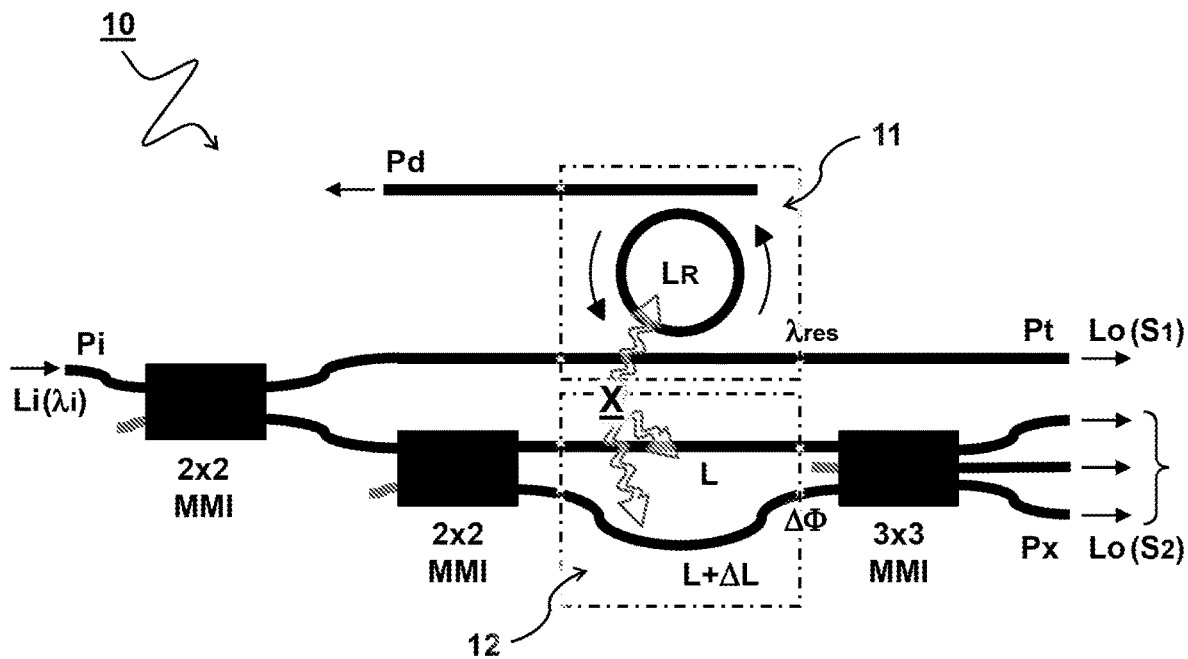
FIG. 2B schematically illustrates an embodiment of a photonic circuit comprising a ring resonator and an MZI.

FIGS. 2A and 2B schematically illustrate different embodiments of a photonic circuit 10 comprising a low range sensor 11 and a high range sensor 12.

In the embodiment of FIG. 2A, the photonic circuit 10 comprises two ring resonators with the same or comparable circumference $L_R$, but wherein one is partly shielded from the effects of the sample property "X" to obtain a lower sensitivity. For example, by shielding a fraction F of the ring, only the remaining fraction (1–F) may be sensitive to the sample property "X". Effectively, a change of the sample property may thus cause a lower wavelength shift in the shielded ring resonator than in the unshielded ring resonator, e.g. wherein the wavelength shift in the shielded ring resonator is a factor (1–F) times the wavelength shift in the unshielded ring resonator. Consequently, large changes in $n_{eff}$ may cause a shift in the shielded sensor of less than its FSR, whereas this same change in $n_{eff}$ may cause a shift in the unshielded sensor of (M+K) times its FSR where M is an integer and 0<=K<1. From the shift of the shielded sensor, the value of M can be determined, so that K can be obtained from the unshielded sensor. Combining these results, an accurate estimate of the sample property X is obtained.

In the embodiment of FIG. 2B, the photonic circuit 10 comprises a combination of a ring resonator and an MZI. Whereas the resonance frequency $\lambda_{res}$ of the ring resonator is determined by the ring circumference $L_R$, the phase shift $\Delta\Phi$ between the paths of the MZI is determined by the path length difference $\Delta L$. The path length difference $\Delta L$ can be chosen relatively low to create a relatively low sensitivity or high range sensor 12. This is an advantage over a ring resonator which may not have arbitrarily low $L_R$, since it has a minimum acceptable curvature below which light may start to leak from the waveguide. The refractive index of both the waveguides of the ring resonator and MZI may be similarly affected by the sample property "X" to cause a similar wavelength shift in the resonance frequency $\lambda_{res}$ as in the wavelength position of a particular phase. The periodicity of the response can be different, e.g. wherein the MZI has a relatively long period compared to the FSR of the ring resonator. Of course also combinations of these and sensors are possible having mutually different periodicity and/or different wavelength shifts. Again, large changes in $n_{eff}$ may cause a shift in the ring resonator sensor of (M+K) times its FSR where M is an integer and 0<=K<1. This same index change will cause a comparable shift of the MZI response, which is now smaller than the MZI FSR, and from MZI response shift (phase change at specific wavelength) the value of M can be determined, so that K can be obtained. Again, combining these results, an accurate estimate of the sample property X is obtained.

Typically, a period or wavelength interval between recurring signals is determined by a respective dimension of a waveguide forming the photonic sensor 11,12 and/or an effective wavelength of light traversing the waveguide. For example, the wavelength interval between different recurrences or modes of a ring resonator can be determined by the circumference or path length $L_R$ of the waveguide forming a ring. Resonances typically occur at effective wavelengths $\lambda_{eff}$ fitting an integer times into the ring path length $L_R$. For example, the wavelength interval between different recurrences or modes in an interferometer such as the MZI can be determined by the path length difference $\Delta L$ between arms of the interferometer. The same phase difference of light traveling the different arms typically occurs when the effective wavelength $\lambda_{eff}$ fits an integer times into the path length difference $\Delta L$. The effective wavelengths $\lambda_{eff}$ can e.g. be varied by sweeping the wavelength $\lambda_i$ of the input light "Li" and/or by changes of the effective refractive index $n_{eff}$ in the waveguide. In some embodiments, the input light "Li" comprises a spectrum of multiple wavelengths measured simultaneously e.g. by a spectrometer.

In some embodiments, the path length difference $\Delta L$ is relatively small, e.g. comparable to or smaller than the effective wavelength $\lambda_{eff}$ or input wavelength $\lambda_i$. In this way a very low sensitivity or very high range sensor 12 can be formed wherein recurrences are far apart, e.g. sufficiently far to uniquely identify a mode number based on a particular phase difference in the second output signal $S_2$. Alternatively, both paths can be the same length, e.g. wherein the effective refractive index $n_{eff}$ along one path has a different sensitivity to the sample property "X" than the other path. For example, one path can be shielded. Preferably, the shielding comprises a cover material with a thickness larger than a penetration depth of an evanescent field between the waveguide and sample. In some embodiments, the wavelength interval of the high range sensor 12 may be larger than a wavelength λi of the input light Li to uniquely determine the mode number of the low range sensor 11 or provide an absolute (low sensitivity or high range) measurement of the sample property X.

In some embodiments, as shown in FIG. 2A, the photonic sensors 11,12 comprise two or more ring resonators 11,12 with equal path length $L_R$, wherein one ring resonator 12 is made less sensitive to the sample property "X" than the other ring resonators 11. For example, the high range sensor 12 is formed by a ring resonator covered by partial shielding. Accordingly, a relative sensitivity or range of the high range sensor 12 is determined by a fraction (1−F) that is unshielded. Alternatively, the relative sensitivity of the sensors 11,12 is determined by a relative amount of deposition of a sensor molecule on the surface of the ring resonators, wherein the sensor molecules bind to the sample "X" to be measured thereby changing the effective refractive index in the waveguide of the sensor.

In a preferred embodiment, as shown in FIG. 2B, the photonic sensors 11,12 comprise a combination of a multi-path interferometer and a ring resonator, wherein the multi-path interferometer forms the high range sensor 12 by a relatively short path length difference ΔL between its different paths and the ring resonator forms the low range sensor 11 by to its relatively short long ring path length $L_R$. The path length difference may be implemented either as a physical length difference or, at the same physical length, as an intentionally designed effective index difference (for example using two different waveguide widths).

In some embodiments, a single input port "Pi" is used for coupling light into both the high and high range sensors. For example, in FIG. 2B a sweeping input wavelength $\lambda_i$ can also be used as input to the MZI, which is unconventional. This can have the advantage of more easily interrogating the device. Alternatively, different input ports can be used (not shown). In some embodiments such as FIG. 2A, a single output port Pt is used for coupling light out of the circuit. For example, each ring resonator can have distinct resonance peaks. In other embodiments such as FIG. 2B, multiple output ports "Pt", "Px" (where x=1, 2, 3) can be used to more easily process different signals.

In some embodiments (not shown), the photonic sensors comprise multiple low range or high sensitivity sensors working together with one high range or low sensitivity sensor. For example, the high range sensor is used to calculate the mode number of a recurring signal in each of the low range sensors. The low range sensor need not all have the same sensitivity or range. In some embodiments a combination of two, three, four, or more sensors is used, wherein different sensors can have different ranges and/or sensitivities. For example, one multi-path interferometer, preferably an MZI employing at least one 3×3 MMI, may act as a high range sensor to distinguish recurring signal values in a plurality of low range ring resonators, having the same or different sensitivities. Because of the small size of the ring resonators compared to the multi-path interferometer, the combination may provide a large number of sensors on a relatively small foot print while distinguishing recurring signal values of the ring resonators.

One embodiment for measuring a sample property "X" by means of photonic circuit 10 comprises applying input light "Li" into the photonic circuit 10 and measuring output light "Lo" out of the photonic circuit 10. Typically, the photonic sensors 11,12 are configured to modulate an intensity of the output light "Lo" with respect to the input light "Li" depending on the wavelength $\lambda_i$. Alternatively, or in addition, depending on the optical circuit also other properties of the light may be modulated such as wavelength or polarization. As described herein, the photonic circuit 10 comprises at least two photonic sensors 11,12 configured to modulate the output light "Lo" with respect to the input light "Li" according to a respective output signal $S_1, S_2$.

Figure 3:
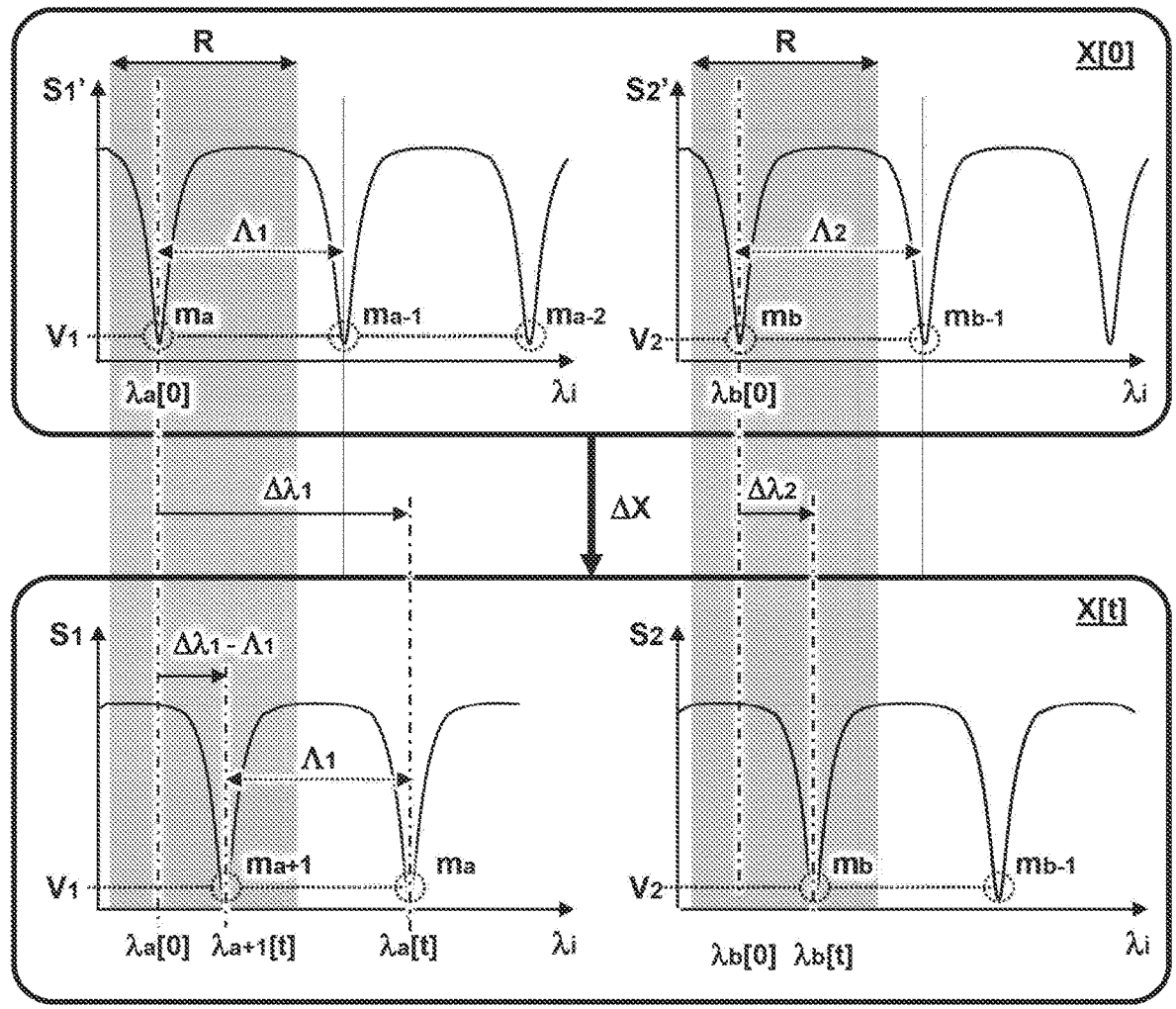
FIG. 3 schematically illustrates signal processing in an embodiment with sensors having different wavelength shifts.
Figure 3:
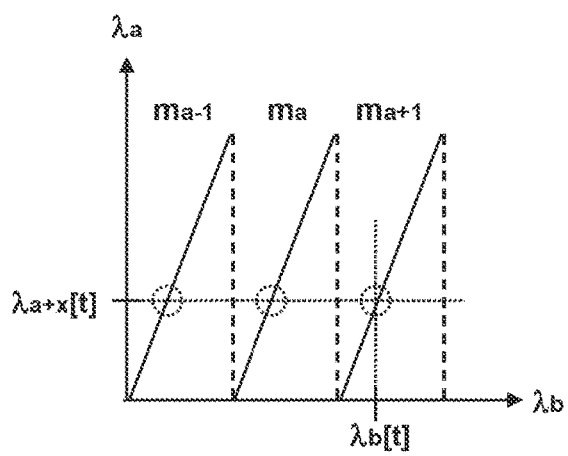
Figure 4:
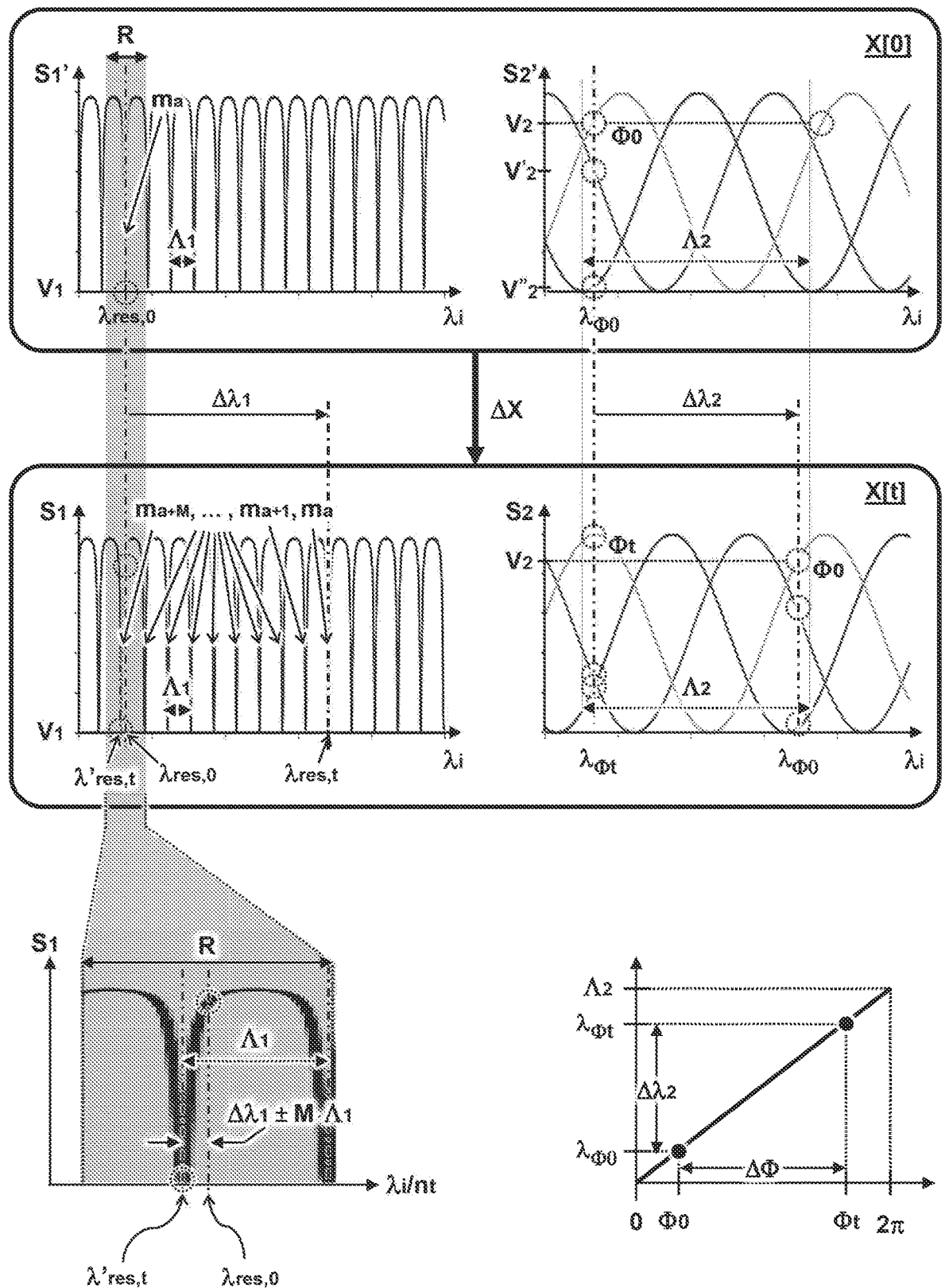
FIG. 4 schematically illustrates signal processing in an embodiment with sensors having different wavelength intervals.

FIGS. 3 and 4 schematically illustrate processing a combination of output signals $S_1$, $S_2$. from sensors having low range and high range to a particular sample property "X". FIG. 3 schematically illustrates processing output signals $S_1, S_2$ in an embodiment with sensors having the same wavelength interval $\Lambda_1 = \Lambda_2$ but different wavelength shifts $\Delta\lambda_1$ and $\Delta\lambda_2$. in reaction to a given change ΔX of the sample property "X". Such signals may e.g. occur in an embodiment as described with reference to FIG. 2A. FIG. 4 schematically illustrates processing output signals $S_1, S_2$ in an embodiment with sensors having the different wavelength interval $\Lambda_1 < \Lambda_2$ but the same or similar wavelength shifts $\Delta\lambda_1$ and $\Delta\lambda_2$. in reaction to a given change ΔX of the sample property "X". Such signals may e.g. occur in an embodiment as described with reference to FIG. 2B.

In sensors having periodic responses $S_1$, $S_2$ as shown in FIGS. 3 and 4, respective signal values $V_1, V_2$ of the respective output signals $S_1$, $S_2$ may periodically recur as a function of a wavelength $\lambda_i$ of the input light "Li" according to a respective wavelength interval $\Lambda_1$, $\Lambda_2$. Furthermore, if the sensors are affected by the sample property "X", a wavelength at which the recurring signal values $V_1$, $V_2$ occur, may shift according to a respective wavelength shift $\Delta\lambda_1$, $\Delta\lambda_2$ as a function of change ΔX in the sample property "X". For example, in FIG. 3 the respective resonance wavelength $\lambda_a$, $\lambda_b$ of a particular mode $m_a$, $m_{a-1}$, $m_{a-2}$ may shift according to a change ΔX between initial sample property X[0] at the upper graph and the subsequent sample property X[t] in the graph there below. For example, in FIG. 4 the resonance wavelength $\lambda_{res,0}$, and the wavelength $\lambda_{\Phi 0}$ at which a particular phase $\Phi_0$ is registered may shift according to the change ΔX between initial sample property X[0] at the upper graph and the subsequent sample property X[t] in the graph there below.

As described herein, two or more photonic sensors may be combined, each having at least some sensitivity to the same sample property "X" but to a different degree. Preferably, the sensors 11,12 are relatively close together, e.g. within a distance of ten millimeter, one millimeter, hundred micrometer, or less. In a preferred embodiment, the sensors comprise a high range sensor 12 for measuring changes ΔX of the sample property "X" over a relatively high range. The high range sensor 12 may complement a low range sensor 11 having a relatively low range for measuring the same changes ΔX of the sample property "X", typically with a relatively high sensitivity.

In some embodiments, the sensitivity of the low range sensor 11 is relatively high and the sensitivity of the high range sensor 12 is relatively low. For example, as shown in FIG. 3, the second wavelength shift $\Delta\lambda_2$ of the high range sensor 12 is smaller than the first wavelength shift $\Delta\lambda_1$ of the low range sensor 11, e.g. by factor two, four, ten, twenty, or more (for the same change $\Delta X$ of the sample property X). For example, a change of the (average) effective refractive index $n_{eff}$ resulting from a change $\Delta X$ of the sample property "X" is lower in the high range sensor 12 than in the low range sensor 11. In some embodiments, the measurement resolution of the low range sensor 11 is better than that of the high range sensor 12. For example, a minimal difference that can be distinguished in measurement values corresponding to a particular (changes of) the sample property X are smaller in the low range sensor 11 than in the high range sensor 12.

In some embodiments, such as FIG. 4, the second wavelength interval $\Lambda_2$ of the high range sensor 12 is larger than the first wavelength interval $\Lambda_1$ of the low range sensor 11, e.g. by factor two, four, ten, twenty, or more. For example, a free spectral range FSR of the high range sensor 12 is larger than a free spectral range of the low range sensor 11. Also combinations of sensors with different wavelength intervals and different wavelength periods are possible.

Typically, the low range sensor, as described herein, is a high-sensitivity sensor having a periodic response to the change of the sample property. This may cause (realistic) sample property changes to result in sensor response changes larger than the periodicity. In some embodiments, the low range sensor, as described herein, is a relatively low or reduced-sensitivity sensor, which may or may not have a periodic response to the change of the sample property, such that the sample property changes result in non-ambiguous sensor response changes.

Generally, the unambiguous range of a respective periodic photonic sensor can be described by $$\Delta X_{max} = \frac{\Lambda}{S}$$

where $\Lambda$ is the sensor periodicity, and S is the sensor transfer function efficiency. For a ring resonator, $S=d\lambda/dX$ with $d\lambda$ the wavelength shift of a resonance induced by a sample property change $dX$. For an MZI, $S=d\varphi/dX$, with $d\varphi$ is the phase shift induced by a sample property change $dX$.

Preferably, the quotient $\Lambda_2/S_2$ of the high range sensor 12 is more than the quotient $\Lambda_1/S_1$ of the low range sensor 11, e.g. by factor two, four, ten, twenty, or more.

For example, in an MZI, the sensitivity $\delta X$ (the smallest detectable sample property change) can be described using $\delta X=\delta\varphi p/S=(\delta\varphi/\Lambda)\cdot\Delta X_{max}=(\delta\varphi/2\pi)\cdot\Delta X_{max}$. The phase sensitivity $\delta\varphi$ is typically determined by the read-out hardware and/or software and the signal-to-noise ratio, and typically independent of the MZI design parameters such as the Free Spectral Range. Consequently, a good sensitivity (small $\delta X$) is in this case associated with a small unambiguous range $\Delta X_{max}$.

For example, in a ring resonator, the sensitivity can be described using $\delta X=(\delta\lambda/\Lambda)\cdot\Delta X_{max}$, where the wavelength sensitivity $\delta\lambda$ is again typically determined by the read-out hardware and/or software and the signal-to-noise ratio. The sensitivity scales with the periodicity $\Lambda$, which is a ring resonator design parameter, so that a considerable unambiguous range $\Delta X_{max}$ can be obtained even at a small $\delta X$. In some embodiments, it is envisaged to increase $\Delta X_{max}$ at small $\delta X$ beyond what is possible in practice by increasing the Free Spectral Range $\Lambda$. For example, a large value for $\Lambda$ is obtained at a small ring circumference, which can be limited by the minimum waveguide bending radius at which waveguide losses are acceptable.

As described herein, the sample property "X" is calculated by combining the output signals $S_1,S_2$ of the at least two photonic sensors 11,12. In particular, the second output signal $S_2$ of the high range sensor 12 can be used to distinguish between recurring signal values $V_1$ in the first output signal $S_1$ of the low range sensor 11. For example, as illustrated at the bottom of FIG. 3, the resonance wavelength $\lambda_a$ of the low range sensor 11 may have several recurrences of the same value for different modes $m_{a-1}, m_a, m_{a+1}$. The recurrences can be distinguished using the resonance wavelength $\lambda_b$ of the additional high range sensor 12.

In some embodiments, the photonic sensors 11,12 are calibrated to identify, by measurement of the second output signal $S_2$, a mode number $m_{a-1}, m_a, m_{a-1}$ of a recurring signal value $V_1$ in the first output signal $S_1$. In the embodiments, as shown in FIGS. 3 and 4, an actual wavelength $\lambda_a[t]$ or $\Delta_{res}[t]$ of the recurring signal value $V_1$ in a particular number mode $m_a$ is calculated by measuring one wavelength $\lambda_{a+1}[t]$ or $\lambda'_{res}[t]$ at which the recurring signal value $V_1$ occurs in a measured wavelength range "R" of the first output signal $S_1$ and adding an integer number M times the wavelength interval $\Lambda_1$ of the low range sensor 11.

In some embodiments, as shown in FIG. 3, the integer number M is based on the wavelength $\lambda_b[t]$ at which a particular signal value $V_2$ in the second output signal $S_2$ occurs. For example, the mode number $m_a+_1$ may be determined based on the wavelength $\lambda_b$ of the second resonance peak. In this case, this would result in the integer number M=1.

In some embodiments, as shown in FIG. 4, the integer number M is based on a phase $\Phi_t$ of the second output signal $S_2$, e.g. at a particular wavelength $\lambda_\Phi t$. For example, the phase shift $\Delta\Phi$ of the MZI can be correlated to the number of mode shifts in the ring resonator, i.e. integer number M for determining the actual wavelength shift $\Delta\lambda_1=(\lambda'_{res,t}-\lambda_{res,0})+M\cdot\Lambda_1$, where $(\lambda'_{res,t}-\lambda_{res,0})$ is the observed shift in the measured wavelength range "R".

In one embodiment, the sample property "X" is calculated based on a difference of the output signal $S_1,S_2$ compared to a reference property X[0]. For example, a current sample property X[t] is calculated based on a difference between a current set of output signals $S_1,S_2$ corresponding to the current sample property "X" and a reference set of output signals $S_1',S_2'$ corresponding to a reference sample property X[0]. Typically, the sample property "X" is measured as a function of time "t". For example, the reference set of output signals $S_1',S_2'$ are the output signals of the sample property "X" measured at a previous time "t"=0. For example, differences in the output signals are correlated to differences in the refractive index n0,nt at different times and corresponding differences of the sample property "X" as a function of time "t". In one embodiment, the sample property "X" is calculated based on a wavelength shift $\Delta\lambda_1, \Delta\lambda_2$ of an identifiable signal value $V_1,V_2$ in the output signals $S_1,S_2$ compared to the reference sample property X[0]. For example, the identifiable signal value $V_1,V_2$ comprises a lowest signal value of a resonance peak or a particular phase of the output signal $S_1,S_2$.

In some embodiments, the sample property "X" rapidly changes between subsequent measurements X[0],X[t] such that a wavelength $\lambda_{res}$ of the recurrences in the first output signal $S_1$ shift more than half the wavelength interval $\Lambda_1$ of the low range sensor 11. For example, relatively large changes of refractive index may occur over a short time when the photonic circuit 10 is put in a different medium, e.g. different media to be measured or from air into a liquid medium. Preferably, the high range sensor 12 is sufficiently insensitive to the changing sample property "X" such that a change in mode number M of a recurrences in the first output signal $S_1$ can be identified.

Preferably, comparative measurements X[0],X[t] of the second output signal $S_2$ are kept within range of the second wavelength interval $\Lambda_2$ of the high range sensor 12, more preferably less than half the second wavelength interval $\Lambda_2$. For example, in FIG. 3 a wavelength shift $\Delta x_2$ in the second output signal $S_2$ of subsequent measurement X[0],X[t] is less than the wavelength interval $\Lambda_2$ of the high range sensor 12. For example, in FIG. 4, wherein a phase shift $\Delta\Phi$ in the second output signal $S_2$ of subsequent measurement X[0], X[t] is less than a full period $2\pi$ of the high range sensor 12.

Figure 5:
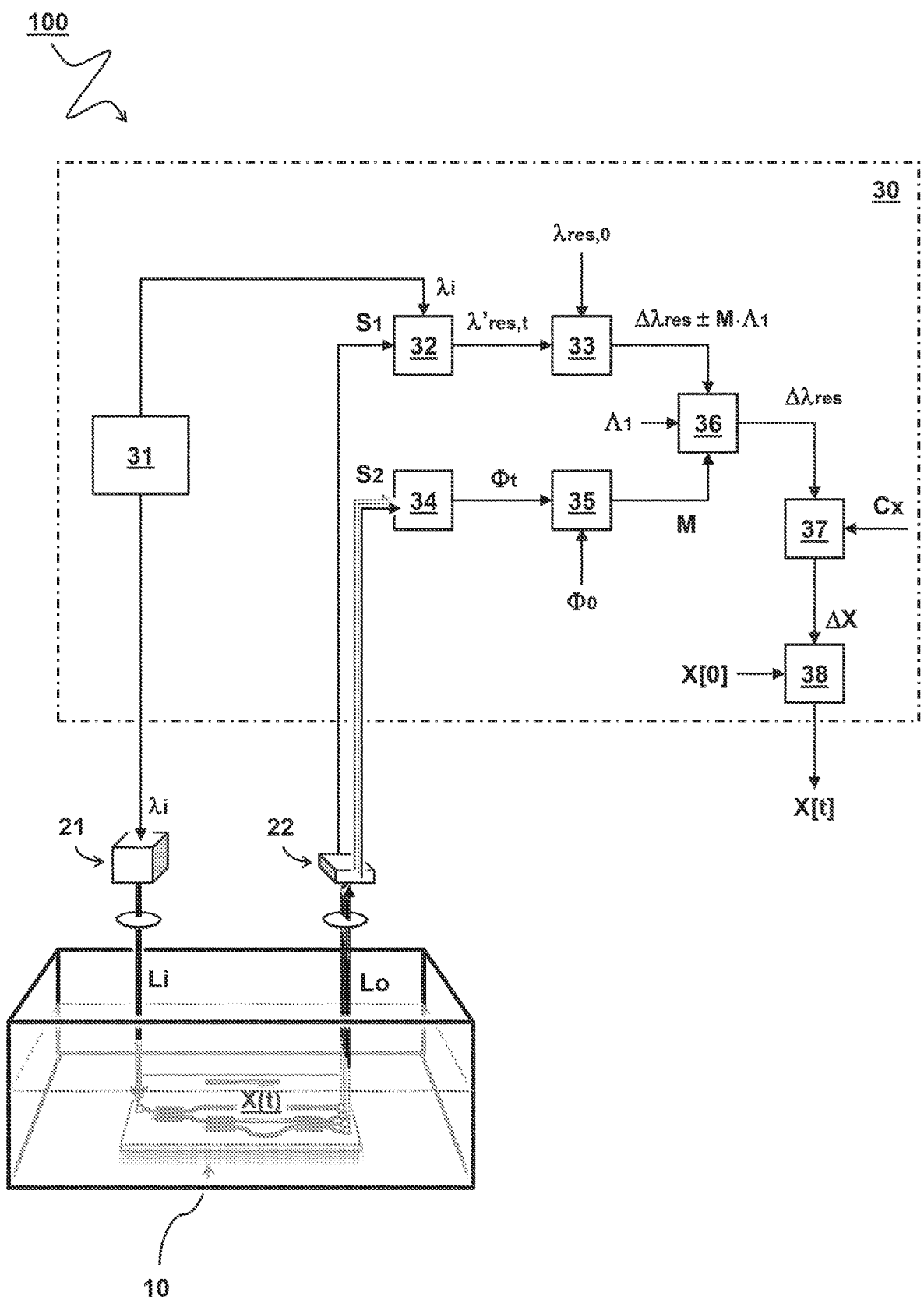
FIG. 5 schematically illustrates a system for measuring a sample property by means of photonic circuit.

FIG. 5 schematically illustrates a system 100 for measuring a sample property "X" by means of a photonic circuit 10.

In the embodiment shown, the system 100 comprises an optical interrogator 21,22 configured to apply input light "Li" into the photonic circuit 10 and measure output light "Lo" out of the photonic circuit 10. As described herein, the photonic circuit 10 comprising two or more photonic sensors. The photonic sensors are configured to modulate the output light "Lo" with respect to the input light "Li" according to a respective output signal $S_1, S_2$. Respective signal values of the respective output signals $S_1, S_2$ periodically recur as a function of a wavelength $\lambda_i$ of the input light "Li" according to a respective wavelength interval $\Lambda_1, \Lambda_2$. A wavelength or phase at which the recurring signal values $V_1, V_2$ occur, shifts according to a respective wavelength shift as a function of change $\Delta X$ in the sample property "X" to be measured. The photonic circuit 10 comprises at least a low range sensor 11 having relatively low range to the change $\Delta X$ of the sample property "X" and a high range sensor 12 having relatively high range to the change $\Delta X$ of the sample property "X".

The system 100 may comprise a controller 30 to perform operational acts in accordance with the methods as described herein. In one embodiment, the controller 30 is configured or programmed to calculate the sample property "X" by combining the output signals $S_1, S_2$ of the at least two photonic sensors 11,12. Particularly, the second output signal $S_2$ of the high range sensor 12 is used to distinguish between recurring signal values in the first output signal $S_1$ of the low range sensor 11.

In one embodiment, the system 100 comprises a light source 21 configured to direct the input light "Li" into the photonic circuit 10. In another or further embodiment, the system 100 comprises a light sensor 22 configured to measure the output light "Lo" from the photonic circuit 10. In some embodiments, the system 100 comprises a wavelength control unit 31 configured to set a wavelength of the input light "Li".

In the embodiment shown, the controller 30 comprises signal processors 32-38 to determine the sample property from the signals S1,S2. While the processors are illustrated as separate blocks, some or all of their functionality can be integrated or combined. As shown, the signal processor 32 is configured to process the first output signal $S_1$ for determining a perceived wavelength $\lambda'_{res,t}$ of a recurring signal value, e.g. resonance dip. The signal processor 33 is configured to calculate a perceived wavelength shift $\Delta\lambda_{res} \pm M \cdot \Lambda_1$ based on the perceived wavelength $\lambda'_{res,t}$ and a reference wavelength $\lambda_{res,0}$. The signal processor 34 is configured to process the second output signal $S_2$ for determining the second signal value $V_2$ e.g. phase $\Phi t$. The signal processor 35 is configured to calculate a mode number M based on the second output signal $S_2$ e.g. by comparing the phase $\Phi_t$ to a reference $\Phi_0$. The signal processor 36 configured to calculate an actual wavelength shift $\Delta\lambda_{res}$ based on the perceived wavelength shift $\Delta\lambda_{res} \pm M \cdot \Lambda_1$ in the first output signal $S_1$ and the mode number M based on the second output signal $S_2$. The signal processor 37 is configured to calculate a change $\Delta X$ in the sample property "X" based on the actual wavelength shift $\Delta\lambda_{res}$ and e.g. a calibration constant Cx, function, or lookup table. The signal processor 38 is configured to calculate the sample property X[t] based on a reference value X[0] and the change $\Delta X$.

The signal processors or other parts of the system may be implemented in hardware or software. In one aspect, the present disclosure may be embodied as a non-transitory computer readable medium comprising software instructions that when executed on a computer, cause the execution of a method as described herein For the purpose of clarity and a concise description, features are described herein as part of the same or separate embodiments, however, it will be appreciated that the scope of the invention may include embodiments having combinations of all or some of the features described. For example, while embodiments were shown for specific sensors and signals, also alternative ways may be envisaged by those skilled in the art having the benefit of the present disclosure for achieving a similar function and result. E.g. different photonic circuits may be combined or some of their components split up into one or more alternative components. The various elements of the embodiments as discussed and shown offer certain advantages, such as combining measurements from two sensors using the low range sensor for accurate measurement and the high range sensor for disambiguation of its periodic dependence. Of course, it is to be appreciated that any one of the above embodiments or processes may be combined with one or more other embodiments or processes to provide even further improvements in finding and matching designs and advantages. It is appreciated that this disclosure offers particular advantages to enable the use of high sensitive periodic sensors for tracking rapidly changing experimental conditions or even to perform an absolute measurement of the refractive index without reference by uniquely identifying mode numbers.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A method for measuring a sample property by a photonic circuit, the method comprising
 applying an input light into the photonic circuit and measuring an output light out of the photonic circuit;

wherein the photonic circuit comprises an at least two photonic sensors configured to interferometrically modulate the output light with respect to the input light according to a respective output signal;

wherein a respective signal values of the respective output signals periodically recur as a function of a wavelength of the input light according, to a respective wavelength interval;

wherein a wavelength at which the recurring respective signal values occur, shifts according to a respective wavelength shift as a function of change in the sample property to be measured by a corresponding change of effective refractive index for light through at least a portion of the at least two photonic sensors;

wherein a relative range of a respective photonic sensor for the sample property is defined by a respective quotient of the respective wavelength interval over the respective wavelength shift for a change in the sample property;

wherein the at least two photonic sensors comprise a low range sensor providing a first output signal and a high range sensor providing a second output signal wherein the high range sensor has a higher relative range for the sample property than the low range sensor;

wherein the sample property is calculated by combining the output signals of the at least two photonic sensors, wherein the second output signal of the high range sensor is used, to distinguish between recurring signal values in the first output signal of the low range sensor; and wherein the at least two photonic sensors comprise a combination of a multi-path interferometer and a ring resonator, wherein the multi-path interferometer forms the high range sensor and the ring resonator forms the low range sensor.

2. The method according to claim 1, wherein the photonic sensors are calibrated to identify, by measurement of the second output signal, a mode number of a recurring signal value in the first output signal.

3. The method according to claim 1, wherein an actual wavelength or an actual shift of wavelength of the recurring signal value in a particular number mode is calculated by measuring one wavelength at which the recurring signal value occurs in a measured wavelength range of the first output signal and adding an integer number times the wavelength interval of the low range sensor, wherein the integer number is based on the second output signal.

4. The method according claim 1, wherein the sample property is calculated based on a difference of the output signal compared to a reference property.

5. The method according to claim 1, wherein the sample property is calculated based on a wavelength shift of an identifiable signal value in the output signals compared to a reference sample property.

6. The method according to claim 1, wherein the sample property rapidly changes between subsequent measurements such that a wavelength of the recurrences in the first output signal shift more than half the wavelength interval of the low range sensor, wherein the high range sensor is sufficiently insensitive to the changing sample property such that a change in a mode number of recurrences in the first output signal can be identified.

7. The method according to claim 1, wherein the respective wavelength interval is determined by at least one of the group consisting of:

a respective dimension of a waveguide forming the photonic sensor, and an effective wavelength of light traversing the waveguide.

8. The method according to claim 1, wherein the wavelength interval of the high range sensor is larger than a wavelength of the input light.

9. The method according to claim 1, wherein the photonic sensors comprise two or more ring resonators with equal path length, and wherein a first ring resonator is made less sensitive to the sample property than another ring resonator of the two or more ring resonators.

10. The method according to claim 1, wherein the photonic sensors comprise multiple low range sensors working together with one high range sensor, and wherein the high range sensor is used to calculate a respective mode number of a recurring signal in each one of the multiple low range sensors.

11. The method according to claim 1, wherein the at least two photonic sensors are configured to modulate an intensity of the output light with respect to the input light depending on the wavelength.

12. The method according to claim 1, wherein the respective quotient indicating the relative range of the high range sensor for the sample property is higher than the respective quotient indicating the relative range of the low range sensor for the sample property by at least a factor ten.

13. A non-transitory computer readable medium comprising computer-executable instructions that, when executed on a computer, cause the execution of a method comprising:

measuring a sample property by means of a photonic circuit by applying an input light into the photonic circuit and measuring an output light out of the photonic circuit;

wherein the photonic circuit comprises an at least two photonic sensors configured to interferometrically modulate the output light with respect to the input light according to a respective output signal;

wherein a respective signal values of the respective output signals periodically recur as a function of a wavelength of the intuit light according to a respective wavelength interval;

wherein a wavelength at which the recurring respective signal values occur, shifts according to a respective wavelength shift as a function of change in the sample property to be measured by a corresponding change of effective refractive index for light through at least a portion of the at least two photonic sensors;

wherein a relative range of a respective photonic sensor for the sample property is defined by a respective quotient of the respective wavelength interval over the respective wavelength shift for a change in the sample property;

wherein the at least two photonic sensors comprise a low range sensor providing a first output signal and a high range sensor providing a second output signal, wherein the high range sensor has a higher relative range for the sample property than the low range sensor;

wherein the sample property is calculated by combining the output signals of the at least two photonic sensors, wherein the second output signal of the high range sensor is used to distinguish between recurring signal values in the first output signal of the low range sensor;

wherein the at least two photonic sensors comprise a combination of a multi-path interferometer and a ring resonator, wherein the multi-path interferometer forms the high range sensor and the ring resonator forms the low range sensor.

14. A system for measuring a sample property by a photonic circuit, the system comprising:
- an optical interrogator configured to apply input light into the photonic circuit and measure output light out of the photonic circuit;
- the photonic circuit comprising an at least two photonic sensors;
- wherein the at least two photonic, sensors are configured to interferometrically modulate the output light with respect to the input light according to a respective output signal;
- wherein a respective signal values of the respective output signals periodically recur as a function of a wavelength of the input light according to a respective wavelength interval;
- wherein a wavelength at which the recurring, respective signal values occur, shifts according to a respective wavelength shift as a function of change in the sample property to be measured by a corresponding change of effective refractive index for light through at least a portion of the photonic sensors;
- wherein a relative range of a respective photonic sensor for the sample property is defined by a respective quotient of the respective wavelength interval over the respective wavelength shift for a change in the sample property;
- wherein the at least two photonic sensors comprise a low range sensor providing a first output signal and a high range sensor providing a second output signal, wherein the high range sensor has a higher relative range for the sample property than the low range sensor; and
- a controller configured to calculate the sample property by combining the output signals of the at least two photonic sensors, wherein the second output signal of the high range sensor is used to distinguish between recurring signal values in the first output signal of the low range sensor;
- wherein the at least two photonic sensors comprise a combination of a multi-path interferometer and a ring resonator, wherein the multi-path interferometer forms the high range sensor and the ring resonator forms the low range sensor.

* * * * *